(12) United States Patent
Gallagher

(10) Patent No.: US 9,630,565 B2
(45) Date of Patent: Apr. 25, 2017

(54) LADDER LOADING SYSTEM

(71) Applicant: RHINO PRODUCTS LIMITED, Deeside, Flintshire (GB)

(72) Inventor: Dominic Gallagher, Flintshire (GB)

(73) Assignee: RHINO PRODUCTS LIMITED, Flintshire (GB)

( * ) Notice: Subject to any disclaimer, the term of this patent is extended or adjusted under 35 U.S.C. 154(b) by 214 days.

(21) Appl. No.: 14/394,405

(22) PCT Filed: Apr. 12, 2013

(86) PCT No.: PCT/GB2013/050949
§ 371 (c)(1),
(2) Date: Oct. 14, 2014

(87) PCT Pub. No.: WO2013/153399
PCT Pub. Date: Oct. 17, 2013

(65) Prior Publication Data
US 2015/0125245 A1 May 7, 2015

(30) Foreign Application Priority Data

Apr. 13, 2012 (GB) .................................. 1206579.3

(51) Int. Cl.
*B60R 9/042* (2006.01)
*E06C 5/24* (2006.01)
(52) U.S. Cl.
CPC ............ B60R 9/042 (2013.01); B60R 9/0423 (2013.01); E06C 5/24 (2013.01)
(58) Field of Classification Search
CPC ..... B60R 9/042; B60R 9/0423; B60R 9/0426; E06C 5/24; B60P 3/1016
(Continued)

(56) References Cited

U.S. PATENT DOCUMENTS 3,058,607 A * 10/1962 Kiley ........................ E06C 5/24
414/462
5,108,251 A * 4/1992 Lougheed ............... B60P 1/483
414/546
(Continued)

FOREIGN PATENT DOCUMENTS

EP 1 127 745 A1 8/2001
EP 1 818 218 A1 8/2007
(Continued)

OTHER PUBLICATIONS

Jun. 18, 2013 Written Opinion issued in International Patent Application No. PCT/GB2013/050949.
(Continued)

*Primary Examiner* — Gary Elkins

(57) ABSTRACT

A ladder loading system includes a base frame and a stowage frame, wherein the stowage frame is rotatable relative to the base frame. The stowage frame and base frame are connected at a least one pivot having a main pivot axis. The ladder loading system includes a linkage mechanism. The linkage mechanism includes an idler link that rotates about an idler axis. The linkage mechanism also includes a coupling means for coupling the idler link to the stowage frame. That is, the rotation of the idler link is linked to the rotation of the stowage frame in a master and slave relationship. Suitably, due to the operation of the ladder loading system, rotation of the stowage frame drives rotation of the idler link about the idler axis. The linkage mechanism further includes a control member connected between the idler link and stowage frame.

14 Claims, 5 Drawing Sheets

(58) Field of Classification Search
USPC .......................................... 224/310; 414/462
See application file for complete search history.

(56) References Cited

U.S. PATENT DOCUMENTS

| | | | | |
|---|---|---|---|---|
| 5,405,234 | A * | 4/1995 | Ziaylek, Jr. ............ | A62C 31/28 224/282 |
| 6,427,889 | B1 * | 8/2002 | Levi ........................ | E06C 5/00 224/310 |
| 6,827,541 | B1 * | 12/2004 | Ziaylek .................... | E06C 5/02 182/127 |
| 7,341,418 | B2 * | 3/2008 | Ito ........................ | B60P 3/1016 414/466 |
| 2006/0280583 | A1 * | 12/2006 | Settelmayer ............ | B60R 9/042 414/462 |

FOREIGN PATENT DOCUMENTS

| | | |
|---|---|---|
| FR | 2 689 073 A1 | 10/1993 |
| FR | 2 850 337 A1 | 7/2004 |
| FR | 2 936 989 A1 | 4/2010 |
| GB | 2 385 572 A | 8/2003 |
| JP | 2005-053403 A | 3/2005 |
| WO | 2006/013434 A1 | 2/2006 |

OTHER PUBLICATIONS

Jun. 18, 2013 Search Report issued in International Patent Application No. PCT/GB2013/050949.

* cited by examiner

LADDER LOADING SYSTEM

The present invention relates generally to ladder loading systems and in particular, although not exclusively, to ladder loading systems for vehicles.

Ladder loading systems are known and provide a quick and safe loading/unloading of ladders on top of vehicles by an operator standing on the ground. A known ladder loading system is described in GB 2 385 572. Here a stowage frame is provided for securing a ladder thereto. The stowage frame slides and rotates relative to a base frame that is attached to the top of the vehicle. The operator can therefore slide and rotate the stowage frame relative to the base frame in order to pull the ladder off the top of the vehicle before pivoting the ladder downwards. The ladder is released from the stowage frame before being used. It will be appreciated that the ladder is loaded in a reverse sequence.

To provide smooth and controlled movement, a control member is provided to retard the angular rotation. Typically, the control member comprises a damper and a spring which are pivotally attached to the base frame and stowage frame. The damper provides smoothing and retardation of movement and the spring provides assisted lift of the ladder from a deployed position to a stowed position on top of the vehicle.

In practice, the spring has been attached at one end to a fixed pivot on the frame and the other end to the stowage frame at a further pivot location. The pivot location on the stowage frame is spaced from a pivot axis between the stowage frame and base frame. This spacing generates the forces necessary to compress the spring, wherein if the spring is spaced closely to the pivot axis, the less torsion the spring produces on the stowage frame and therefore the less efficient the system is. The spring can either go above the pivot point (making a very tall system) or below it, creating an under-hanging mechanism. When the pivot location is spaced beneath the pivot axis, an undercarriage is created that must remain clear of the vehicle. Since the ladder loading system is intended for use on different vehicles and for attachment to different roof racks or rails, the loading system is not always able to be mounted on the vehicle with sufficient space to allow the undercarriage to stay clear of the vehicle. This is particularly the case when: the last roof bar is far back, close to the rear doors; the bar system sits very low to the roof and the mechanism is in danger of touching the roof; or a fully welded rack frame is mounted to the vehicle running the whole length of the roof up to the rear doors. In this case, it is usual for the loading system to be mounted to extend from the rear of the vehicle so that the undercarriage is not directly above the vehicle's roof. However, this is undesirable as it can cause a hazard, and is unsightly.

It is an object of the present invention to attempt to overcome at least one of the above or other disadvantages. It is a further aim to provide a ladder loading system that has a reduced clearance distance for the undercarriage without reducing the operational effectiveness of the loading system.

Whilst the foregoing has been described in relation to a ladder loading system, it will be appreciated that the loading system may be applicable to articles other than a ladder that are required to be stored for transport above a vehicle and particularly applicable to elongate articles for example canoes, kayaks and roof boxes.

According to the present invention there is provided a stowage loading system as set forth in the appended claims. Other features of the invention will be apparent from the dependent claims, and the description which follows.

According to an exemplary embodiment of a stowage loading system, an idler link rotates about an idler axis wherein rotation of the idler link is coupled to rotation of a stowage frame about a main pivot axis. The idler link and stowage frame being interlinked by a control member for controlling rotation of the two parts. That is, the control member is arranged to absorb or apply torsion from the rotation of the stowage frame, typically by expanding or compressing the control member. Advantageously, connecting the control member to an idler link, the rotation of which is coupled to rotation of the stowage frame, acts as a force multiplier so that the control member can be connected closely to the main pivot axis without necessarily requiring an increase in the force required to expand or compress the control member when compared to the force required should the control member be coupled to a pivot fixed with respect to the base frame. That is, rather than using one large radius at one end, two smaller radius can be used on either end. Consequently, the clearance distance for an undercarriage of the stowage loading system can be reduced or even eliminated.

Rotation of the idler link and stowage frame is suitably coupled by a coupling means. Whilst the coupling means may be arranged to rotate the shafts in a 1:1 ratio, in an exemplary embodiment, the coupling means is arranged to rotate the idler pivot connection a greater degree than the main pivot connection. Advantageously, this enables the coupling means to be used to a greater efficiency. The ratio of angular rotation of the storage frame to idler link may be between 1:1 and 1:2 or between 1:1 and 2:3. Furthermore, the angular rotation of the idler link may be more than 5% or more than 10% or more that 15% or more than 20% greater than the angular rotation of the stowage frame.

In an exemplary embodiment, the idler link is coupled to the stowage frame so that the idler link and stowage frame rotate in the same direction. That is, when viewed from a side, the idler link rotates in a clockwise direction when the stowage frame rotates in a clockwise direction and in an anticlockwise direction when the stowage frame rotates in an anticlockwise direction. Rotation of the idler link and stowage frame may be coupled in a number of ways, for instance by a coupling means such as gears, chain and sprocket, or the like. But suitably may be coupled by a tie member. Here, in use, the tie member maintains a location on the idler link at a preset distance to a location on the stowage frame. Suitably, the tie member is pivotally connected to a point fixed with respect to the stowage frame at one end and a point fixed with respect to the idler link at the other. Suitably, the respective points are an equal distance from the idler axis and main axis. However, preferably the tie member may be connected at a larger distance from the main axis than from the idler axis. This has the effect of moving the idler link through a greater angle than the stowage frame, which enables a perpendicular 100% efficiency point of the control member to be utilised. Preferably, the idler link starts beyond perpendicular (slightly less efficient), passes through perpendicular (100% efficient), and thence all the way to a desired over-centre point. Advantageously, the tie member may be adjustable in length so that the start and end positions can be altered and adjusted when installing the stowage loading system.

In an exemplary embodiment, the control member is pivotally connected to the idler link at a point relative to the idler link and spaced from the idler axis and pivotally connected to the a point fixed relative to the stowage frame and spaced from the main axis. Advantageously, the control member is arranged so that the pivot points rotate towards each other for a substantial part of the rotation from a stowed or loaded position to a deployed or unloading position. Suitably, during the final portion of movement from the stowed to deployed positions, the control member and pivot points may be arranged so that the control member is caused to extend. Here, a stop is provided to prevent further rotation of the stowage frame away from the stowed position when reaching the deployed position. Consequently, the control member acts to maintain the stowage loading system in the deployed position. Suitably, the pivot points are arranged so that in the stowed position, one of the pivots is arranged above the respective axis and the other is arranged below the respective axis. In the exemplary embodiments, the pivot point spaced from the idler axis is spaced a first distance and the pivot point spaced from the main axis is spaced a second distance. Suitably, the first distance is greater than the second. That is the idler pivot point is spaced a greater distance than the main pivot point from their respective axes. In an exemplary embodiment, a plurality of pivot locations is provided so that the control member can be connected different distances from the respective axis and so that the stowage loading system can be set to different power levels.

In an exemplary embodiment, suitably a stop is provided to prevent further rotation of the stowage frame away from a stowed position when the stowage frame reaches a deployed position. The stop may be a mechanical abutment. However, in the exemplary embodiments, the stop is suitably provided by a locking of links between the idler link and the stowage frame. For instance, the control member or tie member may be arranged to jam the mechanism when in the deployed position. That is, the geometry of the members and respective connections may be such that further rotation continues to attempt to compress the damper and thus movement is prevented because the damper has reached its full extend.

In exemplary embodiments the control member may comprise a resilient member or may comprise a damper or may comprise a combination of a damper and resilient member arranged between the idler link and stowage frame. The resilient member aids uplift of the system from the deployed position and includes gas rams, gas springs, hydraulically or electrically powered rams or screw actuators and the like. The damper may retard rotation of the respective parts so as to make the movement slow and smooth. Suitably, the damper is separate to the resilient means. In the exemplary embodiments, the damper reaches its shortest length in the deployed position and the damper is arranged so as to act as a jamming link to prevent further rotation away from the stowed position.

As will be appreciated, in the exemplary embodiments, the stowage loading system is adapted to be secured to the top of a vehicle. For instance, the stowage frame rotates relative to a base frame wherein the base frame is attached to the top of a vehicle, for instance to a roof rack or roof bars. It will also be appreciated that the exemplary embodiments are shown as being particularly suitable for stowing a ladder and can therefore be termed a ladder loading system.

For a better understanding of the invention, and to show how embodiments of the same may be carried into effect, reference will now be made, by way of example, to the accompanying diagrammatic drawings in which.

Figure 1A:
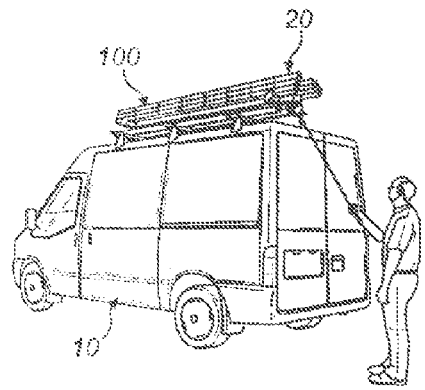
FIG. 1 shows a sequence of Figures a)-f) showing the unloading of a ladder from a ladder loading system.
Figure 1B:
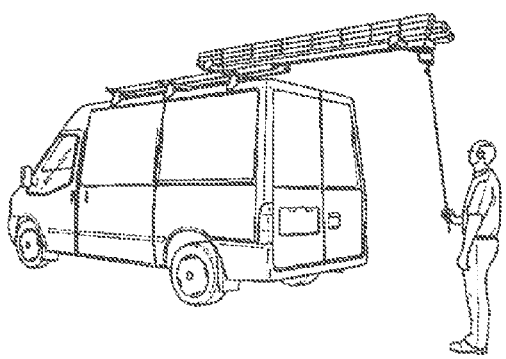
Figure 1C:
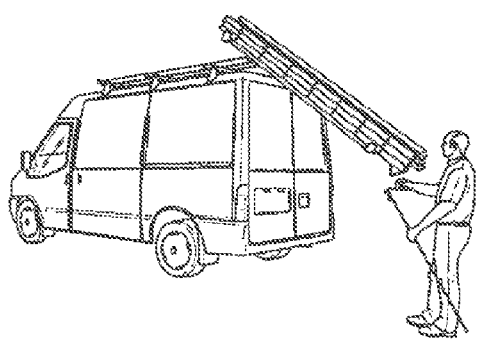
Figure 1D:
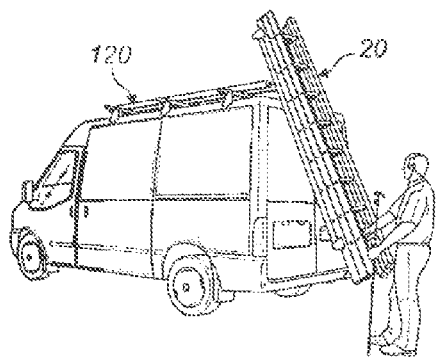

Referring to FIG. 1 a stowage loading system 100 is shown attached to the top of a vehicle 10. Here, the stowage loading system includes a base frame 120 that is secured or attached to the vehicle 10. For instance, the base frame 120 is suitably shown attached to roof bars 12. The ladder stowage system 100 includes a receiver for receiving an article to be stowed. In the Figures, and according to an exemplary embodiment, the article to be stowed is an elongate article such as a ladder and the receiver is adapted accordingly. Consequently and for clarity, herein, the exemplary embodiments will be described in relation to a ladder loading system, though this is not necessarily a limiting feature. Suitably, the ladder is shown as a sectional ladder 20. Here a receiver 110 is arranged to receive and secure in a releasable manner the ladder 20 thereto. Further description of the receiver 110 is not given here as such receivers are known on related art ladder loading systems. As will be understood and with reference to FIG. 1a, the ladder 20 is arranged in a stowed position on top of the vehicle for transportation.

Figure 1E:
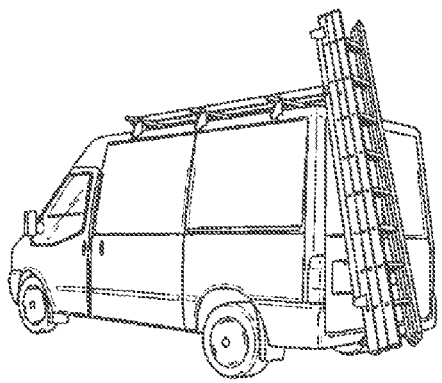
Figure 1F:
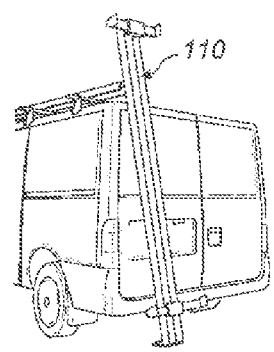

The receiver 110 is typically connected to a stowage frame (not visible in FIG. 1) so as to be able to slide relative thereto. Again, a detailed description of the connection between the receiver and stowage frame is not given here as such connections are known from related art ladder loading systems. Consequently, and referring to FIG. 1b, the ladder and receiver can be extended from the vehicle. Suitably, the ladder is shown as sliding from a rear end of the vehicle 10 as is customary with related art ladder loading systems though other configurations may be employed, such as a side loading arrangement. Once extended a determined distance, the stowage frame rotates relative to a base frame so that the receiver and ladder rotates downwardly (see FIGS. 1c and d) to a deployed position and as shown in FIG. 1e. The ladder 20 can then be removed from the receiver for use—see FIG. 1f.

It will be appreciated that the above description of general operation of the exemplary embodiment of the ladder loading system is not significantly different to related art ladder loading systems. Consequently, the receiver and connection between the receiver and stowage frame may include one or more features known in the art. Moreover, the receiver being able to slide relative to the stowage frame is customary on related art ladder loading systems, but may not be necessary, particularly for other articles. Furthermore, although a description of the rotation between the stowage frame and base frame is given herein, the stowage frame may be rotatable to the base frame in any known manner and again, one or more features from related art ladder loading systems may be employed. Similarly, a detailed description of the connection of the base frame to the vehicle is not given.

The main improvements over related art ladder loading systems relate to a linkage mechanism that controls rotation of the stowage frame to the base frame. A detailed description of the exemplary embodiments is herein given.

According to an exemplary embodiment, the ladder loading system 100 includes the base frame 120 and the stowage frame 130, wherein the stowage frame 130 is rotatable relative to the base frame 120. Suitably therefore, the stowage frame 130 and base frame 120 are connected at a least one pivot 102 having a main pivot axis. The ladder loading system includes a linkage mechanism 140. The linkage mechanism includes an idler link 142 that rotates about an idler axis 144. The linkage mechanism also includes a coupling means for coupling rotation of the idler link 142 to rotation of the stowage frame. That is, the rotation of the idler link 142 is linked to the rotation of the stowage frame in a master and slave relationship. Suitably, due to the operation of the ladder loading system, the stowage frame drives rotation of the idler link 142 about the idler axis 144. Typically, the stowage frame is driven manually by an operator but other configuration are envisaged. The linkage mechanism further includes a control member connected between the idler link 142 and stowage frame 130. Here, the control member is arranged so that rotation of the stowage frame causes the control member to absorb or exert torsional forces of said rotation. As shown, typically the control member is arranged to expand and compress during rotation. The control member is arranged so that said expansion and compression exerts a controlling force on the rotation of the stowage frame.

In the exemplary embodiments the control means is arranged to rotate the idle link a greater degree than the stowage frame.

Figure 2A:
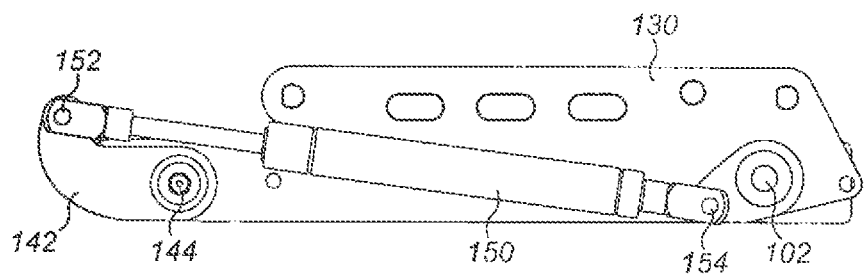
FIG. 2 shows a sequence of side views a) to c) of a ladder loading system according to an exemplary embodiment shown moving from a stowed position to a deployed position.
Figure 2B:
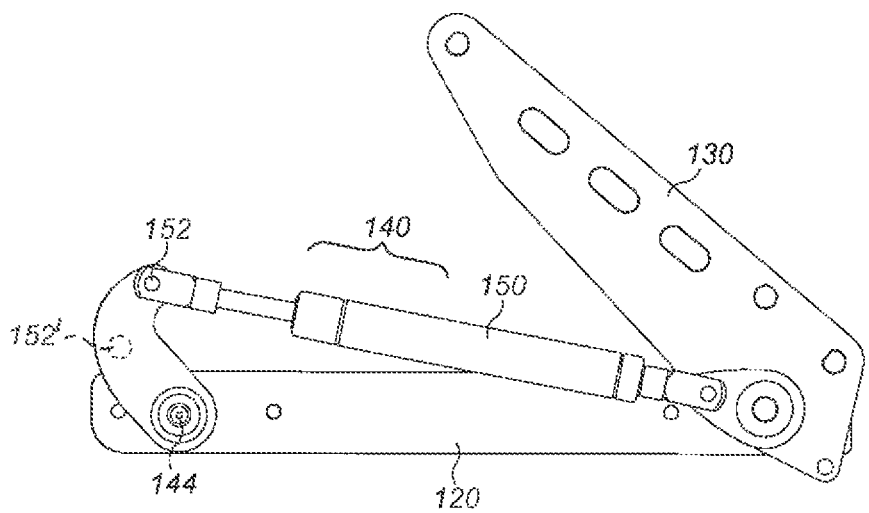
Figure 2C:
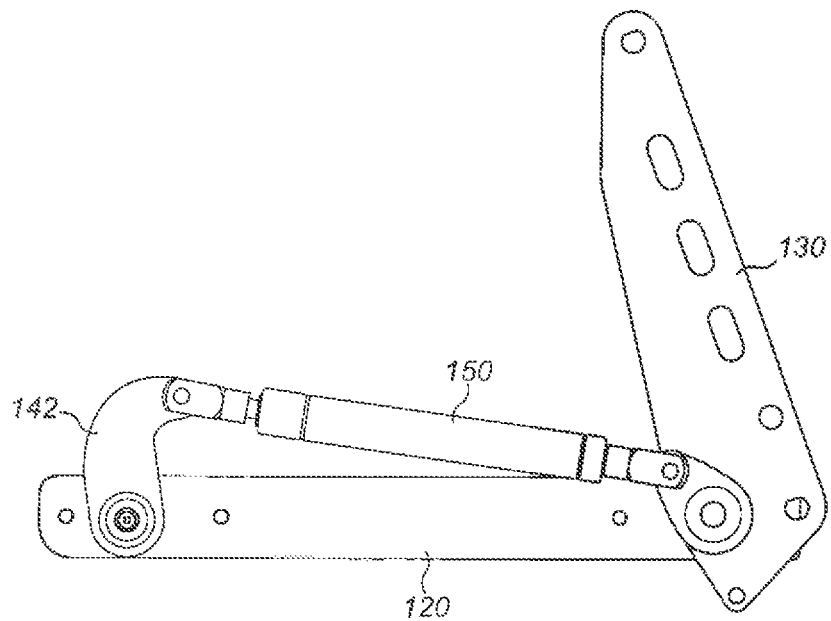

Referring to FIG. 2, an exemplary linkage mechanism 140 is shown. The coupling means (not shown) couples the idler link 142 to the stowage frame so that the two parts rotate in cooperation. That is, rotation of one causes rotation of the other. The two parts rotate relative to the base frame. Consequently the idler axis is fixed relative to the base frame. For instance the idler shaft may be pivotably connected to the base frame or may be joined fast to an idler shaft (not shown) where the idler shaft rotates relative to the base frame. A control means interconnects the idler link 142 and stowage frame 130. The control means may comprise a resilient member, a damper, or a combination of a resilient member and a damper. In FIG. 2, suitably the control means is shown as a damper 150. The damper 150 is a piston type damper and smoothes and slows rotation of the stowage frame by expanding and contracting. The damper is connected to the idler link by pivot 152. Pivot 152 is spaced from idler axis 144. Advantageously, the idler link 142 may include a plurality of pivot locations 152' so that the force required to compress and extend the damper is adjustable. It will be appreciated that the pivot locations 152' are therefore arranged at different distances from the idler axis 144. The damper 150 is connected to the stowage frame by pivot 154. Pivot 154 is spaced from main pivot axis 102. Pivot 154 is fixed relative to the stowage frame. Consequently, the damper may be pivotably connected to the stowage frame 130 or may be connected to a main link that is held fast relative to the stowage frame. For instance, the main link and stowage frame may be coupled fast to a common main shaft (not shown). The spacing between the pivot and idler axis may be greater than the distance between the main axis and pivot. Suitably, the distance may be greater than 200% or greater than 210% or greater than 220% of the smaller distance.

In the exemplary embodiments, the idler axis 144 and main pivot axis 102 are arranged substantially on the same horizontal plane. Here, in the stowed position (FIG. 2a) pivot 154 that connects the damper to the stowage frame is suitably arranged beneath the main pivot axis 102 and suitably between the main pivot axis 102 and idler axis 144. Pivot 152 is suitably located above the idler axis 144 and suitably to a side of the idler axis 144 opposite to the side to which the main pivot axis is arranged. Rotation of the stowage frame 130 from the stowed position (FIG. 2a) through a mid position (FIG. 2b) and to a deployed position (FIG. 2c) is caused by rotating the stowage frame. Here, both the idler link and main link are caused to rotate in the same direction and given the arrangement of the pivots towards each other so as to cause the damper to compress. Compression of the damper attenuates rotation of the stowage frame. When in the deployed position, the damper reaches its maximum compression and further rotation of the stowage frame away from the stowed position is prevented by a jamming of the linkage mechanism. In reverse, the stowage frame 130 is rotated from the deployed position to the stowed position which causes rotation of the idler link and extension of the damper. Said extension of the damper smoothes and slows the movement of the stowage frame.

Because rotation of the idler link is coupled to rotation of the stowage frame, the spacing of the pivots from the respective axis can be reduced compared to the damper being connected to a fixed or non driven pivot.

Figure 3A:
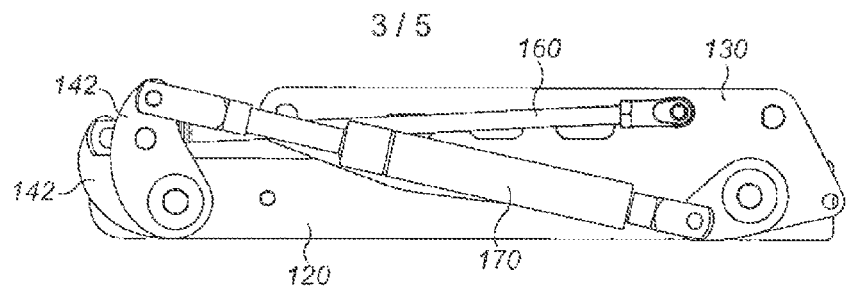
FIG. 3 shows a sequence of side views a) to c) of a ladder loading system according to a further exemplary embodiment shown moving from a stowed position to a deployed position.
Figure 3B:
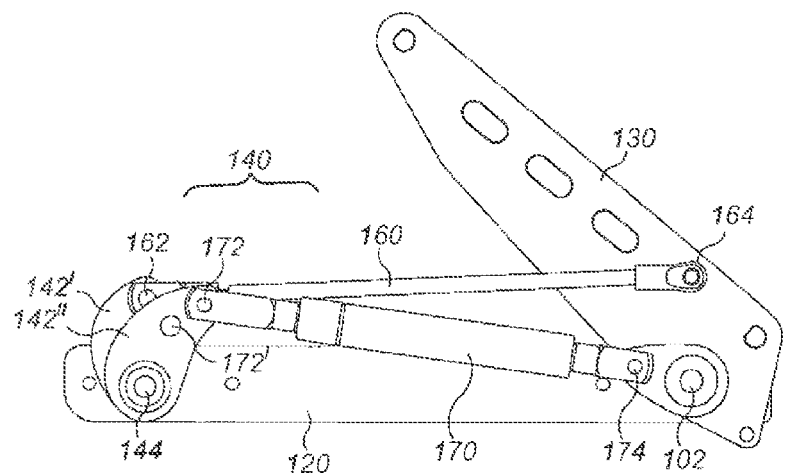
Figure 3C:
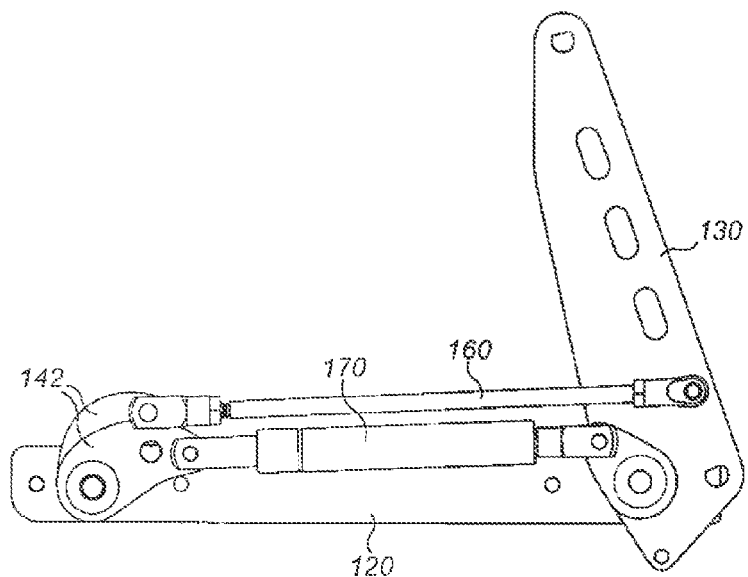

A further exemplary embodiment of the linkage mechanism 140 is described in relation to FIG. 3. Here the coupling means is shown as a coupling member such as a tie member or tie rod 160. The tie rod 160 is a fixed length member and connects the idler link 142 to the stowage frame 130. As shown, suitably, the tie rod is connected to the idler link at pivot 162. Pivot 162 is spaced from the idler axis 144. The tie rod is further connected to rotate relative to the stowage frame. For instance the tie rod 160 may be connected to the stowage frame at pivot 164 or may alternatively be connected to a main link that rotates about the main pivot axis, wherein the main link and stowage frame are connected fast to each other, for instance by being fixed fast to a common main shaft. Pivot 164 is spaced from main pivot axis 102. The spacing between pivot 162 and the idler axis and the spacing between pivot 164 and main pivot axis 102 may be substantially identical. Alternatively, the spacing of pivot 162 may be greater than the spacing of pivot 130 and their respective axes so that the idler link is rotated a greater degree than the stowage frame. For instance, the spacing from the main pivot axis to the respective pivot may be greater than 5% or greater than 10% or greater than 15% of the distance from the idler axis to the respective pivot. Both pivots 162 and 164 are suitably arranged above the idler axis and the main pivot axis through the rotation of the stowage frame. Suitably, the tie rod 160 remains substantially level with the vehicle's roof. Advantageously, the tie rod is adjustable in length. The length of the tie rod can therefore be set when installing the ladder loading system to fine tune the arrangement of the ladder and receiver when in the stowed and deployed positions.

Still referring to FIG. 3, the control means may comprise a damper as herein described. Alternatively or additionally, the control means may comprise a resilient member such as a spring or gas piston. Suitably, in FIG. 3, the control means is shown as a sprung piston 170. The sprung piston is pivotally connected relative to the idler link and the stowage frame by pivots 172, 174. Although pivot 174 may be connected directly to the stowage frame 130, suitably pivot 174 is connected to a main link 104. Main link 104 rotates about main pivot axis 102 and is fixed fast to the stowage frame. For instance, the main link 104 and stowage frame 130 are both fixed fast to a common main shaft. Similarly, pivot 172 is arranged to rotate about idler axis 144 and may be connected to the same idler link 142 as the damper and/or tie rod are connected to or alternatively a plurality of idler links 142', 142" may be provided for receiving each control means or coupling means, wherein each idler link 142', 142" rotates about the idler axis and is fixed fast to each other, for instance, each idler link 142', 142" is fixed fast to a common idler shaft. As described above, a plurality of positions for the pivots may be provided on the respective parts so as to provide adjustability to the system. Also, the distance from the respective pivot and the idler pivot axis may be 15% or 20% greater than the distance from the respective pivot and the main pivot axis or may be greater than 210% or 220%.

Suitably, in the exemplary embodiments and as described above, the sprung piston 170 is arranged so that the pivots rotate about their respective shafts in a common direction and so that the sprung piston 170 is caused to substantially compress when moving from the stowed position to the deployed position and to substantially extend when moving from the deployed position to the stowed position. The word substantially is used because the resilient member may be arranged so that the maximum compression is reached prior to the stowage frame being rotated fully to the deployed position. Advantageously, the resilient member is therefore arranged to begin to expand towards the end of the rotation to the deployed position. Consequently, the sprung piston acts to maintain the stowage frame in the deployed position. This can be referred to as an "over-centre" position.

Figure 4:
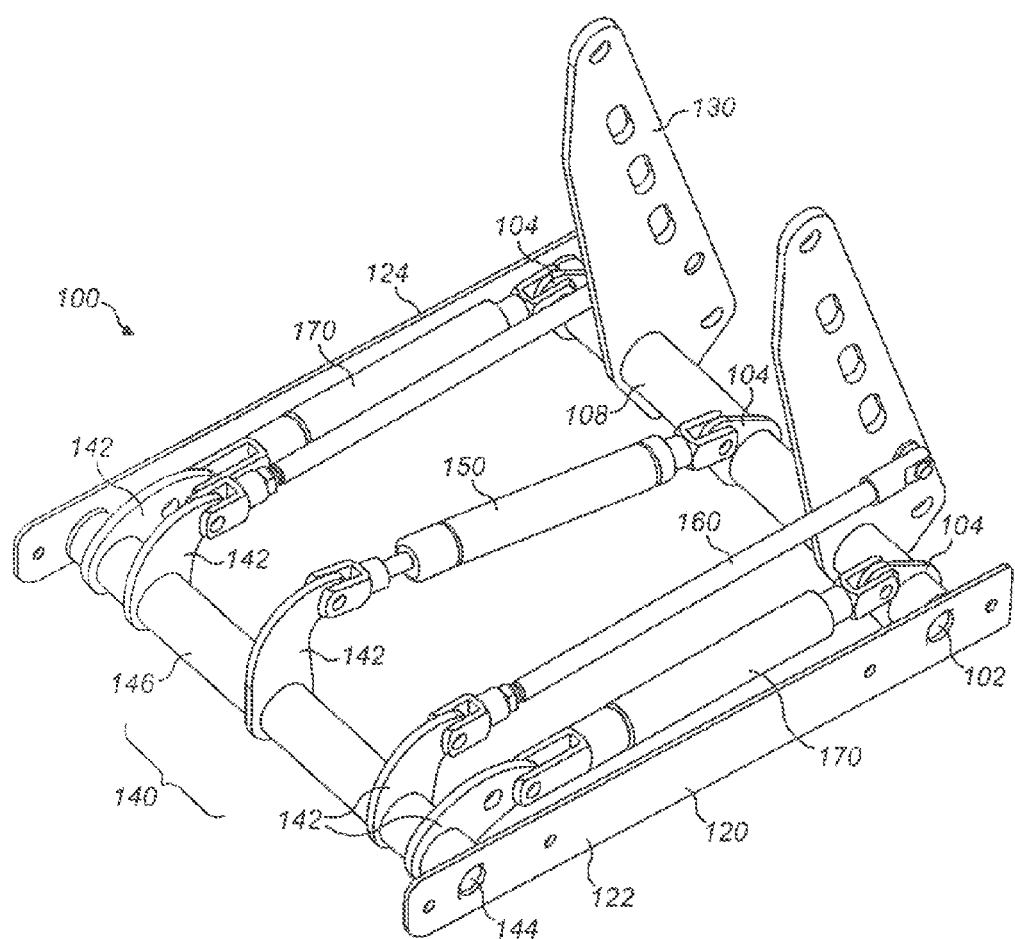
FIG. 4 is a perspective top view of a ladder loading system according to a further exemplary embodiment shown in a deployed position.

A further exemplary embodiment of the ladder loading system 100 is shown in relation to FIG. 4. The ladder loading system includes a base frame 120 for attaching to a vehicle's roof. Here the base frame includes two parallel side bars 122, 124. A stowage frame 130 is connected to the base frame and able to pivot relative thereto about a main pivot axis 102. Here, suitably the stowage frame is fixed fast to a main shaft 108 that is rotatably held between the side members 122, 124 of the base frame. The stowage frame is arranged to receive an item to be stowed such as a ladder and may suitably be arranged for connecting to a demountable carriage such as a receiver (not shown). A linkage mechanism 140 is provided to control rotation of the stowage frame. The linkage mechanism includes a plurality of idler links 142 that rotate relative to the base frame about an idler axis 144. Here, suitably the idler links are fixed fast relative to each other and are shown each being attached to a common idler shaft 146 that is arranged to rotatably held between the side members 122, 124 of the base frame. The linkage mechanism 140 also includes a coupling means to couple rotation of the respective parts about the main pivot axis 102 to the rotation of the respective parts about the idler axis 144. Suitably, the coupling means is arranged to rotate the idler link a greater degree than the stowage frame in a geared relationship. Here, suitably, the coupling means is shown as a plurality of tie rods 160, for instance two tie rods 160 both as herein described. The tie rods 160 couple rotation of the idler shaft to the main pivot shaft. The tie rods each being connected to one of the idler links 142 and a side of the stowage frame. Although only one tie rod is strictly required, the pair of tie rods assist symmetrical stability to the rotation of the stowage frame and also help share the load so that lower forces are carried by each tie rod. The linkage mechanism further includes a control means. Suitably the control means comprises a damper 150 and a resilient member 170. Again, whilst only one resilient member is required, advantageously, a plurality or pair of resilient members is provided, which may assist symmetrical stability, and allows the load exerted by each resilient member to be shared. Furthermore, different power applications can be provided by providing a plurality of fixings for a plurality of resilient members but leaving one or more of the fixings without a resilient member. Each of the damper and resilient members are connected by a pivot to one of the idler links as herein described. Each of the damper and resilient members are also connected by a pivot to one of a plurality of main links 104 as herein described, wherein each of the main links are attached fast to the main shaft According to the exemplary embodiments a stowage loading system such as a ladder stowage system is provided wherein the spacing between the pivot of a control means and the main pivot axis can be reduced without requiring an increase in force required to rotate the stowage frame or to be exerted by the control means. Consequently the undercarriage of the stowage loading system can be minimised, which allows the system to be attached to a wider range of vehicles and attaching systems without the need for the system to overhang the edge of the vehicle to avoid interference with the vehicle and system parts. Also, the under hang can be eliminated whilst maintaining a low profile to the stowage loading system.

Figure 5:
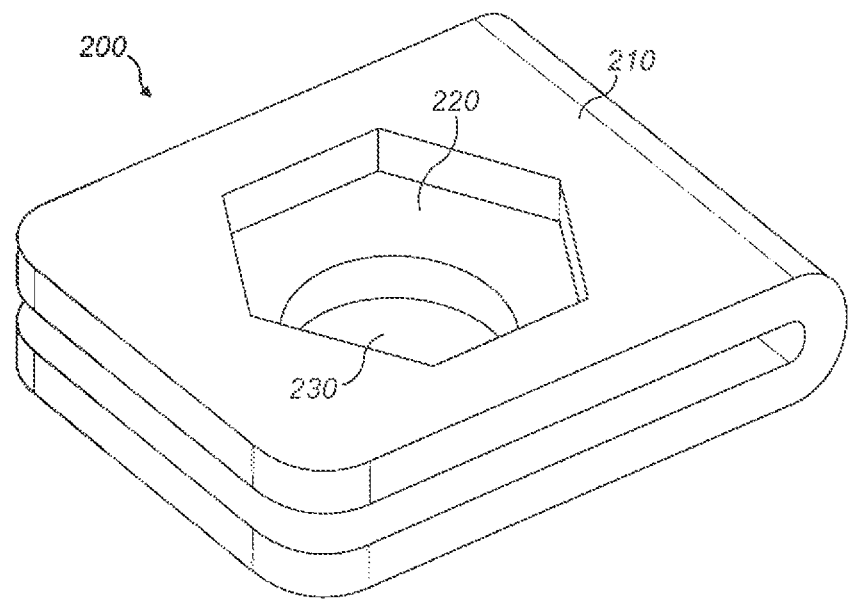
FIG. 5 is a perspective view of a conversion member according to a further exemplary embodiment.
Figure 6:
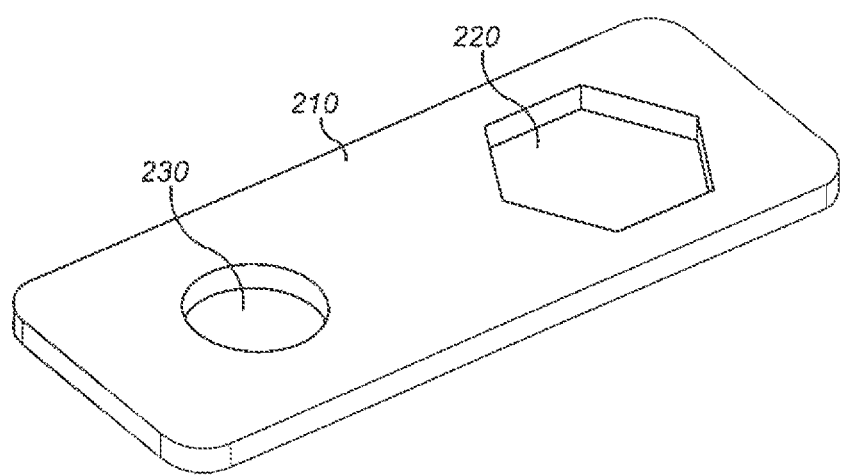
FIG. 6 is a perspective view of a plate for forming a conversion member of a further exemplary embodiment.

According to a further exemplary embodiment, a conversion member 200 is provided. The conversion member 200 provides means to convert a hex head fixing such as a hex head screw, bolt or nut in to a suitable fixing to locate in a track plate. Advantageously, the conversion member converts off-the shelf fixings. Track plates are commonly used on roof racks and bars and in the construction, assembly or fitting of stowage loadings systems and the like. As shown in FIG. 5, the conversion member 200 has a body having a recessed through hole. One side of the body provides a entrance shaped to fit a shank of a fixing and the other side of the body provides an entrance shaped to receive a head of a bolt or nut or the like. For instance, a hex fixing is used as an example, though it will be appreciated that fixings having other shaped heads may be employed by simple selection of the shaped entrance.

Referring to FIG. 5, the conversion member 200 therefore provides a body 210 having a shank hole aligned to a larger head hole. Consequently, the conversion member provides a recessed through hole that can receive a nut or bolt type fixing for use in a track plate.

FIG. 5 shows an exemplary forming method. However, it is envisaged that the conversion member may also be formed by other methods such as casting, forging or machining. The exemplary embodiment is formed from a plate within which a shank hole and head hole are formed. The shank hole and head hole are formed through the plate and spaced from each other. The plate is then folded on-itself and along a line between the two holes such that the two holes come into register.

Although preferred embodiment(s) of the present invention have been shown and described, it will be appreciated by those skilled in the art that changes may be made without departing from the scope of the invention as defined in the claims.

The invention claimed is:

1. A stowage loading system for loading and unloading an article from a roof of a vehicle, the stowage loading system comprising:
   a base frame for connection to the vehicle;
   a stowage frame that is connected to the base frame and able to rotate relative to the base frame about a main pivot axis; and
   a control member for controlling rotation of the stowage frame relative to the base frame; wherein:

the stowage loading system further comprises:
an idler link that is arranged to rotate relative to the base frame and about an idler axis;
a coupling means connected between the idler link and the stowage frame that couples rotation of the stowage frame about the main pivot axis to the rotation of the idler link about the idler axis; and
the control member being connected between and arranged to act on the idler link and stowage frame.

2. The stowage loading system of claim 1, wherein the coupling means is arranged to rotate the idler link a greater degree than the stowage frame.

3. The stowage loading system of claim 1, wherein the coupling means couples the idler link and stowage frame to rotate in the same direction.

4. The stowage loading system of claim 1, wherein the coupling means is a tie member that is pivotally connected relative to the idler link and pivotally connected relative to the stowage frame.

5. The stowage loading system of claim 4, wherein a distance from the pivotal connection relative to the idler link and the idler axis is less than the distance from the pivotal connection relative to the stowage frame and main axis.

6. The stowage loading system of claim 4, wherein the tie member is adjustable in length.

7. The stowage loading system of claim 1, wherein the control member is pivotally connected relative to the idler link and pivotally connected relative to the stowage frame and arranged to expand and contract due to rotation of the stowage frame.

8. The stowage loading system of claim 7, wherein the control member is arranged so that said pivot points rotate towards each other for a substantial part of the rotation from a stowed or loaded position to a deployed or unloading position.

9. The stowage loading system of claim 8, wherein the control member is arranged to reach full extension or contraction at the deployed position, and so that further rotation of the stowage frame is prevented.

10. The stowage loading system of claim 8, wherein the control member is arranged so that, during a final portion of movement from the stowed to deployed positions, the control member is arranged to extend or contract from its maximum or minimum extent.

11. The stowage loading system of claim 1, wherein the control member is a damper or a resilient member or both a damper and resilient member.

12. The stowage loading system of claim 1, comprising a ladder wherein the article to be stowed is the ladder.

13. A vehicle storage system comprising a stowage loading system of claim 1.

14. A vehicle having a vehicle stowage system of claim 13.

* * * * *